Oct. 18, 1927.
O. E. ENELL
1,646,280
METHOD OF TREATING WAX AND THE PRODUCTS RESULTING FROM SAME
Filed Dec. 24, 1924
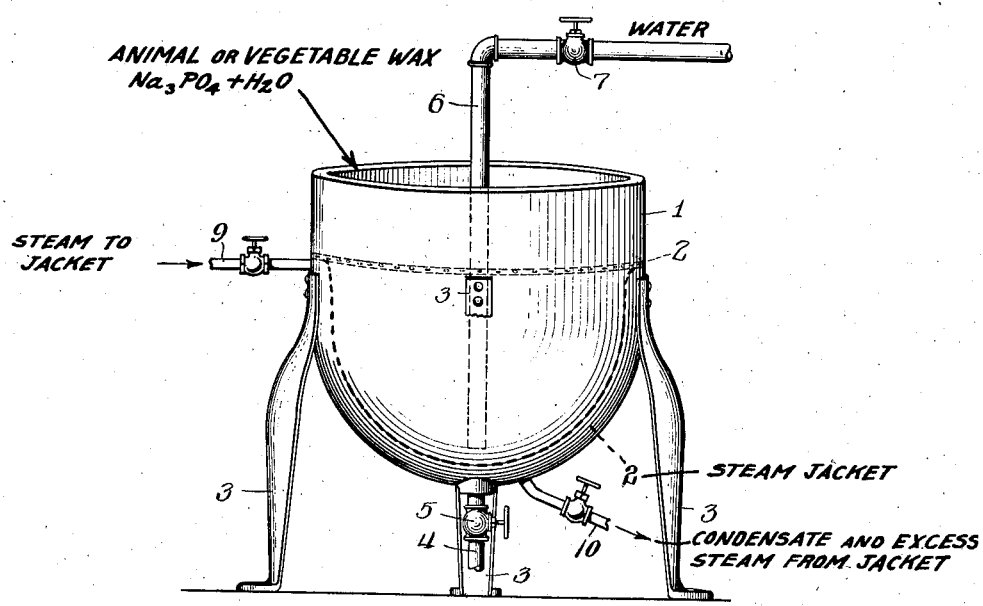
Witness:
R. Burkhardt
Inventor:
Otto E Enell,
By Wilkinson, Huxley, Byron & Knight
Attys.

Patented Oct. 18, 1927.

1,646,280

UNITED STATES PATENT OFFICE.

OTTO E. ENELL, OF ALHAMBRA, CALIFORNIA, ASSIGNOR TO CHADELOID CHEMICAL COMPANY, OF NEW YORK, N. Y., A CORPORATION OF WEST VIRGINIA.

METHOD OF TREATING WAX AND THE PRODUCTS RESULTING FROM SAME.

Application filed December 24, 1924. Serial No. 757,815.

The present invention relates to methods of treating normally solid wax particularly non-mineral wax and the products resulting therefrom.

An object of the present invention is to provide a method of treating wax which will decrease the density of same.

A further object is to provide a method of treating wax which will render same more readily miscible with liquids to form a resulting composition which will for greatly prolonged periods of time maintain its desired consistency.

A further object is to provide a method of treating waxes which is simple in its nature and inexpensive and effective to render said wax miscible with a liquid to form a homogeneous and stable product.

In the making of many products in which waxes are used, such as paint and varnish removers, floor wax, furniture wax, wax mixtures for coating paper, wood, steel, plaster, etc., the wax is to be dissolved or thoroughly incorporated with liquids which may be solvents or non-solvents therefor, but it is desired to maintain the wax in a softened state or otherwise well mixed with the said liquids, and to maintain a stable and relatively homogeneous mixture of the constituents.

Further objects will appear as the description proceeds.

The accompanying drawing illustrates diagrammatically certain apparatus by means of which the present invention may be carried out.

In the manufacture of pastes and liquids containing wax and a liquid (e. g. paint and varnish removers), difficulty has been encountered due to the fact that the wax will separate out. In a great number of preparations this wax will harden or granulate, so that the product as originally manufactured becomes, after a time, practically non-usable. In other cases, distinct strata of liquid and semi-solids are formed which require heating and stirring if practical uniformity is to be had. Such articles of commerce, when used by unskilled persons or workmen not exercising the highest degree of care, do not give the best results.

The present invention contemplates a method by means of which wax may be so treated that it may be mixed with fluid (e. g. the liquid constituents of a paint and varnish remover), and will remain in a state of suspension in said fluid for indefinite periods of time, or at least will remain in suspension for a much longer period than when using the same kind of wax in an untreated state. The products of said method are useful in many arts, as, for example, the art of making polishes, the art of making varnish removers, the art of making floor wax, the art of making furniture wax, the art of making wax coatings for paper, wood, steel and plaster, and a legion of other arts.

According to the present invention, a normally solid non-mineral wax, or waxes such, for example, as carnauba wax, is treated with a predetermined quantity of trisodium phosphate and water. The mixture of wax, trisodium phosphate and water is boiled in a kettle or other receptacle. By this boiling process a substance is obtained which has smooth, creamy or soap-like characteristics, the density being variable by varying the proportions of the ingredients and the time and temperature of the treatment. The boiling process above referred to will have the advantage, also, of throwing out from the wax many impurities which may occur therein, such as tar, oils and other foreign substances. Said impurities or foreign substances in many cases have greater density than the smooth substances of creamy or soap-like consistency above referred to, and will settle at the bottom of the kettle or other receptacle. The precipitate of impurities may be drawn off from the bottom of said kettle or receptacle, and the wax product may if desired, be washed with water to assist in the removal of impurities. Said washing with several changes of water will remove most of the free trisodium phosphate. By continued washings the amount of free trisodium phosphate may be reduced to a very small amount. In many instances, however, the presence of trisodium phosphate to the extent of a few per cent in the finished product is decidedly beneficial. If the presence of trisodium phosphate in a free state in the final product is desired, the amount of washing may be cut down, or trisodium phosphate may be added after the product has been washed to the desired extent.

Without restricting the invention to details, the following is given as a preferred treatment of carnauba wax of the common ordinary variety, of what might be considered to be about an average grade of purity. 10 pounds of the carnauba wax are melted and say 5 gallons of water containing 2 pounds of trisodium phosphate are added, (hot or cold). The mass is brought to about the boiling point of water and stirred well for say 10 minutes. The steam is then cut off and the mass allowed to settle, the melted wax floating on the aqueous material, in which the impurities have largely settled to the bottom. The water and sludge are then drawn off from the bottom, leaving the relatively pure wax in the receptacle. The wax can then be washed, with water, as stated below. The boiling and agitation with trisodium phosphate can be continued for a longer time, or can be repeated several times if a more thorough purification is desired, but for ordinary uses of the wax, one treatment will be enough.

As above stated, the present invention is suitable for use with various normally solid non-mineral waxes, further examples of such waxes that may be cited include Japan wax, beeswax and barberry wax. The above proportions, temperatures, etc., can be used with these waxes, but with beeswax, on account of its higher acidity, I would ordinarily use rather larger amounts of the trisodium phosphate, say 30 to 35% (based on the amount of the wax).

A diagrammatic showing of apparatus appears in the drawing. It will be understood that said apparatus is merely illustrative of a simple apparatus which may be used in carrying out the present invention. Referring to said drawing, the numeral 1 indicates a kettle, which may be provided with a steam jacket, indicated by the numeral 2, for the purpose of heating said kettle. Steam can be admitted to the jacket through valved pipe 9 and withdrawn through valved pipe 10. Said kettle may be carried by the standards 3—3 and the kettle proper may have an outlet 4 at its bottom, which outlet is controlled by the valve 5. Extending into said kettle is the pipe 6, which may be controlled by the valve 7. As clearly indicated in the drawing, the pipe 6 extends to a region adjacent to the bottom of the kettle. The treated wax, which is of a smooth, creamy or soap-like consistency floats upon the hot water beneath same, which hot water contains the impurities which have been thrown out of the wax by action of the trisodium phosphate used. Cool water will be admitted through the pipe 6, and the outlet valve 5 will be opened to such an extent as to flush out the bottom of the kettle, leaving the wax there. This will chill the supernatant product which is desired to be produced. This chilling will result in the formation of a semi-solid substance, the density of which depends upon the proportion of the trisodium phosphate, water and wax, to each other, the length of time of treatment, and the temperature of the treatment, as above referred to.

After the water containing the impurities above referred to has been drawn off, the valve 5 may be closed and fresh water admitted through the pipe 6. The fresh supply of water may be heated to the degree necessary to liquefy the mass, which has a creamy, soap-like consistency above referred to. Agitation may be applied to the contents of the kettle by a paddle or other stirring device, (not shown) whereby further impurities will be washed out of said substance. The liquid at the bottom of the kettle may be again chilled by the application of cold water, which application will chill the supernatant substance, which will again attain a semi-solid consistency. The water may then be drawn off from the bottom of the kettle. Further washings may be given, if preferred, to produce a substance of the desired purity.

The resultant product may be mixed with other waxes, or may be mixed with other waxes and liquids, or may be mixed with liquids without the addition of other waxes, to produce a permanently homogeneous paste or fluid mixtures useful in many arts. It is of course obvious that the nature and quantity of the said other substance to be mixed with the purified wax will depend on the particular final product to be produced and this purified wax can be substituted in various formulas known in the art, in place of unpurified waxes. Such formulas being well known, need not be given here.

It is to be understood that the steps above recited are given merely for the purpose of illustrating the invention and are not to be considered in a limiting sense. Many modifications will occur to those skilled in the art. It is intended to cover all such modifications that fall within the scope of the appended claims.

The use of the treated waxes in paint and varnish removers is claimed in my copending application 757,816, filed concurrently herewith.

What is claimed is:

1. The method of treating a normally solid non-mineral wax which consists of heating same at least sufficient to liquefy the same in contact with trisodium phosphate and water and allowing heavy impurities to settle out.

2. The method of treating normally solid non-mineral wax which consists in heat-treating same in contact with liquid water and trisodium phosphate, the temperature being sufficient to melt the wax, washing out the impurities thrown out by such treatment and chilling the remainder of the waxy material to provide a substance of relatively low density.

3. A purified normally solid non-mineral wax product comprising the constituents of untreated non-mineral wax of the same kind, substantially free from those normal constituents of impure wax of the same kind which are capable of being removed by treatment with hot trisodium phosphate solution, such product being of a somewhat lower specific gravity than the untreated wax, and being less liable to granulate and separate out from varnish remover on standing than the untreated wax, and being of a softer consistency than the untreated wax.

4. The method of purifying normally solid animal and vegetable waxes which consists in melting the wax and adding thereto an aqueous solution of trisodium phosphate, and agitating the mass while sufficiently hot to keep the wax molten, then allowing the mass to settle and separate into an upper layer of purified wax and a lower aqueous layer containing the trisodium phosphate solution and the sludge of impurities removed from the wax, cooling the mass to solidify the wax, and draining the aqueous liquid and sludge from the wax.

Signed at Chicago, Illinois, this 24th day of November, 1924.

OTTO E. ENELL.